US011764696B2

(12) United States Patent
Plum

(10) Patent No.: US 11,764,696 B2
(45) Date of Patent: Sep. 19, 2023

(54) DIRECT-CURRENT VOLTAGE CONVERTER FOR BIDIRECTIONAL ELECTRICAL POWER TRANSMISSION FROM A PRIMARY SIDE TO A SECONDARY SIDE OF THE DIRECT-CURRENT VOLTAGE CONVERTER OR VICE VERSA

(71) Applicant: Robert Bosch GmbH, Stuttgart (DE)

(72) Inventor: Thomas Plum, Cologne (DE)

(73) Assignee: Robert Bosch GmbH, Stuttgart (DE)

( * ) Notice: Subject to any disclaimer, the term of this patent is extended or adjusted under 35 U.S.C. 154(b) by 207 days.

(21) Appl. No.: 17/416,048

(22) PCT Filed: Dec. 6, 2019

(86) PCT No.: PCT/EP2019/084011
§ 371 (c)(1),
(2) Date: Jun. 18, 2021

(87) PCT Pub. No.: WO2020/126554
PCT Pub. Date: Jun. 25, 2020

(65) Prior Publication Data
US 2022/0052610 A1 Feb. 17, 2022

(30) Foreign Application Priority Data

Dec. 21, 2018 (DE) ..................... 10 2018 222 714.4
Jun. 19, 2019 (DE) ..................... 10 2019 208 942.9

(51) Int. Cl.
*H02M 3/335* (2006.01)
(52) U.S. Cl.
CPC ... *H02M 3/33584* (2013.01); *H02M 3/33507* (2013.01); *H02M 3/33592* (2013.01)

(58) Field of Classification Search
None
See application file for complete search history.

(56) References Cited

U.S. PATENT DOCUMENTS 9,991,799 B2 * 6/2018 Liu .................... H02M 3/01
10,063,159 B1 8/2018 Kong et al.
(Continued)

FOREIGN PATENT DOCUMENTS

DE 19507084 A1 9/1996
JP 2015192525 A 11/2015
(Continued)

OTHER PUBLICATIONS

Translation of International Search Report for Application No. PCT/EP2019/084011 dated Mar. 2, 2020 (2 pages).
(Continued)

*Primary Examiner* — Jeffrey A Gblende
(74) *Attorney, Agent, or Firm* — Michael Best & Friedrich LLP

(57) ABSTRACT

The invention relates to a direct-current voltage converter (10) for electrical power transmission from a secondary side to a primary side of the direct-current voltage converter (10), which has on the primary side an actively clamped flyback converter circuit having a controlled first switch (1) and a controlled second switch (2), and the primary side is inductively coupled to the secondary side. The current of a secondary coil (6) on the secondary side, for inductive coupling to the primary side, is switched by a single controlled third switch (3) on the secondary side, and the direct-current voltage converter has a regulator (12) which, in parts of a regulating cycle, conductively connects the third switch (3) to the first switch (1).

9 Claims, 2 Drawing Sheets

(56) References Cited

U.S. PATENT DOCUMENTS

| | | | |
|---|---|---|---|
| 2004/0062061 A1 | 4/2004 | Bourdillon et al. | |
| 2005/0185425 A1* | 8/2005 | Liang ................ | H02M 3/33571 |
| | | | 363/16 |
| 2017/0257033 A1 | 9/2017 | Liu et al. | |
| 2018/0131286 A1* | 5/2018 | Song ................ | H02M 3/33538 |
| 2019/0222131 A1* | 7/2019 | King ................ | H02M 3/33592 |

FOREIGN PATENT DOCUMENTS

| | | |
|---|---|---|
| JP | 2015228788 A | 12/2015 |
| JP | 2018107924 A | 7/2018 |
| JP | 2018148623 A | 9/2018 |
| JP | 2018152974 A | 9/2018 |

OTHER PUBLICATIONS

Chen et al., "Actively Clamped Bidirectional Flyback Converter", IEEE Transactions on Industrial Electronics, vol. 47, No. 4, 2000, pp. 770-779.

* cited by examiner

DIRECT-CURRENT VOLTAGE CONVERTER FOR BIDIRECTIONAL ELECTRICAL POWER TRANSMISSION FROM A PRIMARY SIDE TO A SECONDARY SIDE OF THE DIRECT-CURRENT VOLTAGE CONVERTER OR VICE VERSA

BACKGROUND OF THE INVENTION

The invention relates to a DC-DC converter for bidirectional electrical power transmission from a primary side to a secondary side of the DC-DC converter or vice versa having an asymmetrical topology which switches a current of a secondary-side secondary coil by means of a single controlled switch.

PRIOR ART

So-called DC-to-DC converters or DC-DC converters are used to transfer electrical power between two DC voltage levels. There is a multiplicity of possible topologies for such converters. One of these possible topologies is the so-called active clamp flyback topology, which is also referred to as actively clamped flyback converter and is characterized by a low number of electronic components. In this case, the rectifier is implemented on the secondary side as the controlled switch.

DE 195 07 084 A1 proposes a flyback converter in the form of a switching controller whose rectifier can be bypassed in the output circuit by an electronic switch. This electronic switch is controlled so as to be conducting in synchronism with the switching controller actuating element. The switching controller of the invention has a high efficiency and good parallel-running properties. The electronic switch is in parallel with the rectifier of the secondary side. The switch is controlled in accordance with the invention synchronously and in push-pull fashion with respect to the control of the switching controller actuating element, i.e. when the switching controller actuating element is turned off via the pulse-width modulator PBM, the field-effect transistor is controlled so as to be conducting and therefore bypasses the rectifier with a low resistance.

With such a circuit topology and the corresponding known modulation method, i.e. drive pattern or else voltage-time characteristic of the states of conduction of the three controlled switching transistors, an electrical power flow takes place from the primary side to the secondary side of this circuit.

For bidirectional operation, this actively clamped flyback converter topology is symmetrically extended in the prior art (Gang Chen, Yim-Shu Lee, S. Y. R. Hui, Dehong Xu and Yousheng Wang, "Actively clamped bidirectional flyback converter", in IEEE Transactions on Industrial Electronics, vol. 47, no. 4, pp. 770-779, August 2000). Thereby, even for reasons of symmetry alone, operation from the secondary side to the primary side is additionally also possible.

Such DC-DC converters are used, for example, as on-board power supply system converters for an electric vehicle, in which, generally, an electrical power is diverted from the much higher voltage on the primary side to the secondary side, thus, for example, from 400 V to 12 V. In this case, scenarios result in which a reverse power flow needs to be provided with as little circuitry complexity as possible.

The object of the invention consists in providing a DC-DC converter with the circuit topology corresponding to an actively clamped flyback converter and a controlled rectifier in the secondary circuit which enables an electrical power transmission from the secondary side to the primary side.

SUMMARY OF THE INVENTION

In accordance with the invention, a DC-DC converter, a method for electrical power transmission, a computer program product, a computer-readable storage medium, and a drive system in accordance with the features of the independent claims are specified which have at least some of the mentioned effects. Advantageous configurations are the subject matter of the dependent claims and the description below.

A DC-DC converter for electrical power transmission from a secondary side to a primary side of the DC-DC converter is provided. The DC-DC converter comprises a DC-isolating transformer having a primary-side primary coil and a secondary-side secondary coil. The primary coil is connected on one side to a first primary voltage terminal and is connected on the other side, in series with a first switch, to a second primary voltage terminal. In parallel with the primary coil, a capacitor is connected in series with a second switch. The secondary coil is connected on one side to a first secondary voltage terminal and is connected on the other side, in series with a third switch, to a second secondary voltage terminal. Furthermore, the DC-DC converter comprises a regulating device, which is designed to open and close the first, second and third switches repeatedly, in particular in accordance with a drive pattern, or to switch them correspondingly off and on. In this case, the first switch is always switched off when the second switch is switched on, and vice versa, for generating an AC voltage in the primary coil. The third switch is switched off and on depending on the switch position of the first switch. The regulating device is designed to set a time at which the third switch is switched on to a time before the first switch is switched off and the second switch is switched on in order to enable a power flow from the secondary side to the primary side.

The switching-off of the first switch and the switching-on of the second switch, and vice versa, always takes place with an offset by a dead time in order to ensure that the first and second switches are never conducting at the same time. The switching-off of this third switch advantageously takes place shortly before the zero crossing of the current through this switch. Depending on the working point, therefore, different time intervals result between the switching-off of the second switch and the switching-off of the third switch.

The second and third switches are in particular switched off at the same time. The second and third switches are switched on at slightly different times. Therefore, the second and third switches are switched on and off virtually at the same times. The time period for which the third switch is switched on longer than the second switch is in particular 1-20% of the duration for which the second switch is switched on. In this way, the third switch can be switched off, as described, at its current zero crossing. As a result, minimal conduction losses and switching losses are achieved for this switch. The longer the third switch is switched on for in comparison with the second switch, the more power is transmitted from the secondary side to the primary side.

Advantageously, a circuit topology having a regulating device is provided which enables an electrical power transmission from the secondary side to the primary side of the DC-DC converter.

In another configuration of the invention, the regulating device is designed to set the time at which the third switch is switched on to a time after the first switch is switched off and the second switch is switched on in order to enable a power flow on the side of the primary side to the secondary side.

The second and third switches are in particular switched off at the same time. The second and third switches are switched on at slightly different times. Therefore, the second and third switches are switched on and off virtually at the same times. The time period for which the third switch is switched on for less time than the second switch is in particular 1-20% of the duration for which the second switch is switched on. The less time for which the third switch is switched on in comparison with the second switch, the more power is transmitted from the primary side to the secondary side.

Advantageously, a circuit topology having a regulating device is provided which enables an electrical power transmission also from the primary side to the secondary side of the DC-DC converter.

In another configuration of the invention, the regulating device is designed to set, depending on a presettable power transmission direction, the time at which the third switch is switched on to a time before or after the first switch is switched off and the second switch is switched on in order to set a power flow corresponding to the preset power transmission direction.

A DC-DC converter is provided which, depending on a preset, adapts the power transmission direction through the DC-DC converter by virtue of the time at which the third switch is switched on being set, depending on the switch position of the first switch, to a time which is set to before or after the time at which the first switch is switched off. Advantageously, a DC-DC converter is provided whose power transmission direction is presettable.

In another configuration of the invention, the regulating device is designed to set, depending on a presettable power, the interval of the time at which the third switch is switched on before or after the time at which the first switch is switched on, wherein the interval is increased as the power to be transmitted increases and is reduced as the power decreases.

A DC-DC converter is provided which adapts the power through the DC-DC converter depending on a preset by virtue of the relationship between the switch-on duration of the third switch and that of the second switch being changed. Advantageously, a DC-DC converter is provided whose power is presettable.

In other words, a circuit for a DC-DC converter, in particular having the topology of an actively clamped flyback converter, having a regulating device is provided which implements a modulation method for the control of the switches which makes it possible to implement an electrical power flow from the secondary side to the primary side without in the process in particular excessive complexity in terms of circuitry in respect of further electronic components being generated.

The DC-DC converter according to the invention for electrical power transmission from a secondary side to a primary side of the DC-DC converter has, on the primary side, in particular an actively clamped flyback converter circuit. This circuit switches the current in the primary circuit with a controlled first switch. This circuit can be implemented with different topologies, but of equivalent functionality.

A controlled second switch in the primary circuit, in particular together with a capacitor, effects the active clamping and limits a voltage on the primary side in order to reduce, inter alia, the loading on the first switch. The primary side of the DC-DC converter is inductively coupled to the secondary side. As a result, an electrically inductive and DC-isolated power transmission between the primary side and the secondary side is enabled in both directions.

The secondary side is inductively coupled to the primary side via a secondary coil. The current through this secondary coil is switched by means of a, in particular a single, controlled secondary-side third switch. In this case, the DC-DC converter has a regulating device, in particular a regulating circuit. In the case of the inductive coupling, the coupling can be implemented in such a way that the voltage at the one coupled primary coil of the primary side is in opposition to the voltage of the other coupled secondary coil. For this purpose, in particular the windings of the coils which form the inductances can have a different winding sense.

In this case, the primary side is defined as the side of the DC-DC converter which has a controlled half-bridge with the first switch and the second switch, wherein these two controlled switches can be driven in particular in alternating fashion in such a way that they are never switched so as to be conducting at the same time during operation.

With such a DC-DC converter, a power flow can take place from the secondary side to the primary side, in particular without any additional electronic components.

In comparison with an actively clamped flyback converter which controls the power flow from the primary side to the secondary side, for the reverse power flow the first switch of the primary side is only switched so as to be nonconducting, i.e. switched off, when the controlled third switch of the secondary side is switched so as to be conducting, i.e. switched on, whereby an electrical power flow from the secondary side to the primary side is achieved.

The electrical power is therefore inductively transmitted from the secondary side to the primary side. This energy is initially stored in the capacitor and then in the primary coil of the primary side before the energy is output to a load on the primary side.

With the modulation method illustrated here, i.e. the sequence of control signals of the regulating device for the three switches, the first switch and the second switch are operated using so-called zero voltage switching (ZVS), i.e. switching takes place only in actively nonconducting fashion, but not in actively conducting fashion.

The switch-off operation of the third switch, i.e. the nonconducting switching, takes place by means of the reverse recovery or by means of the off-time delay of the reverse-conducting diode of the third switch. This mode of operation is also referred to as zero current switching (ZCS). The third switch is also switched on by means of ZCS.

By virtue of this topology, the loading on the first switch is reduced during nonconducting switching since a current of the primary coil commutates to the circuit part with the second switch and the limiting capacitor.

The primary side of this DC-DC converter can have a pair of terminals which is connected to the flyback converter circuit in such a way that, during operation of the DC-DC converter, with a power flow from the secondary side to the primary side, an electrical power can be provided at these terminals.

The secondary side of this DC-DC converter can have a pair of secondary voltage terminals which is connected to the secondary coil and the third switch in such a way that, during operation of the DC-DC converter, with a power flow from the secondary side to the primary side, an electrical power can be taken up at these secondary voltage terminals.

For this purpose, the pair of secondary-side terminals can be electrically connected to a third series circuit comprising the third switch and the secondary coil.

In accordance with one configuration of the invention, it is proposed that the first series circuit is connected in parallel with a first DC-link capacitor. This results in a voltage which is kept constant at the primary side terminal of the DC-DC converter. Alternatively, the first DC-link capacitor can also be part of another circuit, to which the DC-DC converter according to the invention is electrically connected and therefore which is not part of the DC-DC converter.

In accordance with a further configuration of the invention, it is proposed that the third series circuit is connected in parallel with a second DC-link capacitor, as a result of which the voltage at the secondary side terminal of the DC-DC converter is smoothed. Alternatively, the second DC-link capacitor can also be part of another circuit, to which the DC-DC converter according to the invention is electrically connected.

In accordance with one measure improving the invention, it is proposed that at least one of the three switches of the DC-DC converter is manufactured on the basis of silicon technology, silicon carbide technology or gallium nitride technology. In comparison with, for example, a MOSFET on the basis of silicon technology as the electronic switch, the use of components based on other manufacturing technologies can result in a higher degree of efficiency of the DC-DC converter since there are fewer losses.

In accordance with one measure improving the invention, it is proposed that individual or all three switches of the DC-DC converter are in the form of HEMTs (high-electron-mobility transistor), JFETs (junction-gate FET or non-insulated-gate FET, NIGFET), power MOSFETs, IGBTs (insulated-gate bipolar transistor) or thyristors. Furthermore, cascodes, i.e. series circuits of normally-on components and low-voltage semiconductors, or else high-electron-mobility transistors (HEMT) can be used for controlling the current flow.

In addition, other unipolar components can be used for controlling the current flow. Using a unipolar component gives the advantage of the lower on-state voltage, such as in the case of the MOSFET transistor.

In addition, the invention relates to a method for controlling a DC-DC converter in order to transmit electrical power from a secondary side to a primary side of the DC-DC converter. The DC-DC converter in this case comprises a transformer having a primary-side primary coil and a secondary-side secondary coil. The primary coil is connected on one side to a first primary voltage terminal and is connected on the other side, in series with a first switch, to a second primary voltage terminal. In parallel with the primary coil, a capacitor is connected in series with a second switch. The secondary coil is connected on one side to a first secondary voltage terminal and is connected on the other side, in series with a third switch, to a second secondary voltage terminal. The DC-DC converter further comprises a regulating device for controlling or performing the following steps:

repeated switching-off and switching-on of the first, second and third switches, wherein the first switch is always switched off when the second switch is switched on, and vice versa, for generating an alternating current in the primary coil. Switching-off and switching-on of the third switch depending on the switch position of the first switch.

Furthermore, the regulating device controls further steps: presetting of a time at which the third switch is switched on as a time before the first switch is switched off and the second switch is switched on in order to enable a power flow on the side of the secondary side to the primary side.

Advantageously, a method for driving a DC-DC converter is provided which enables an electrical power transmission from the secondary side to the primary side of the DC-DC converter.

In another configuration of the invention, the regulating device also controls further steps:

presetting of a time at which the third switch is switched on as a time after the first switch is switched off and the second switch is switched on in order to enable a power flow on the side of the primary side to the secondary side.

Advantageously, a method for driving a DC-DC converter is provided which also enables an electrical power transmission from the primary side to the secondary side of the DC-DC converter.

In another configuration of the invention, the regulating device also controls further steps:

determination of a presettable power transmission direction;

presetting of a time at which the third switch is switched on as a time before or after the first switch is switched off and the second switch is switched on depending on the determined power transmission direction.

A method for driving a DC-DC converter is provided which, depending on a preset, adapts the power transmission direction through the DC-DC converter by virtue of the time at which the third switch is switched on being set, depending on the switch position of the first switch, to a time which is set to before or after the time at which the first switch is switched off. Advantageously, a method for driving a DC-DC converter is provided in which a power transmission direction to be set through the DC-DC converter is presettable.

In other words, a method for controlling a DC-DC converter is specified in order to transmit electrical power from a secondary side to a primary side of the DC-DC converter. The DC-DC converter has, in particular on the primary side, an actively clamped flyback converter circuit having a controlled first switch and a controlled second switch.

In this case, the primary side of the DC-DC converter is inductively coupled to the secondary side by means of a primary-side primary coil and a secondary-side secondary coil. The current through the secondary coil in the case of this DC-DC converter is switched by a, in particular a single, third switch. In particular, the first switch and the second switch are switched so as to be conducting, correspondingly switched on, alternately for the power transmission, in particular with an offset by a first dead time. Corresponding to this method, in particular the third switch and the second switch are switched so as to be nonconducting, correspondingly switched off, in synchronism with an offset by a second dead time.

With this method, the described DC-DC converter can transport an electrical power from its secondary side to its primary side.

For this purpose, the first switch of the primary side is only switched off when the controlled third switch of the secondary side is switched on, as a result of which there is an electrical power flow from the secondary side to the primary side.

This method can also be performed with all other configurations described above of the DC-DC converter.

In addition, the invention relates to a computer program product, wherein said computer program product comprises commands which, when the program is run on a computer, instruct said computer to implement the above-described method.

In addition, the invention relates to a computer-readable storage medium, which comprises commands which, when run on a computer, instruct said computer to implement the above-described method.

In addition, the invention relates to a system having a first DC source, which has a first voltage, and a second DC source, which has a second voltage: the first voltage is higher than the second voltage. Furthermore, the system has a DC-DC converter as is described above. The first DC source of the first voltage is electrically connected to the primary side of the DC-DC converter, and the second DC source of the second voltage is connected to the secondary side of the DC-DC converter.

BRIEF DESCRIPTION OF THE DRAWINGS

Exemplary embodiments of the invention are illustrated in FIGS. 1 and 2 and will be explained in more detail below. In the drawing.

DETAILED DESCRIPTION

Figure 1:
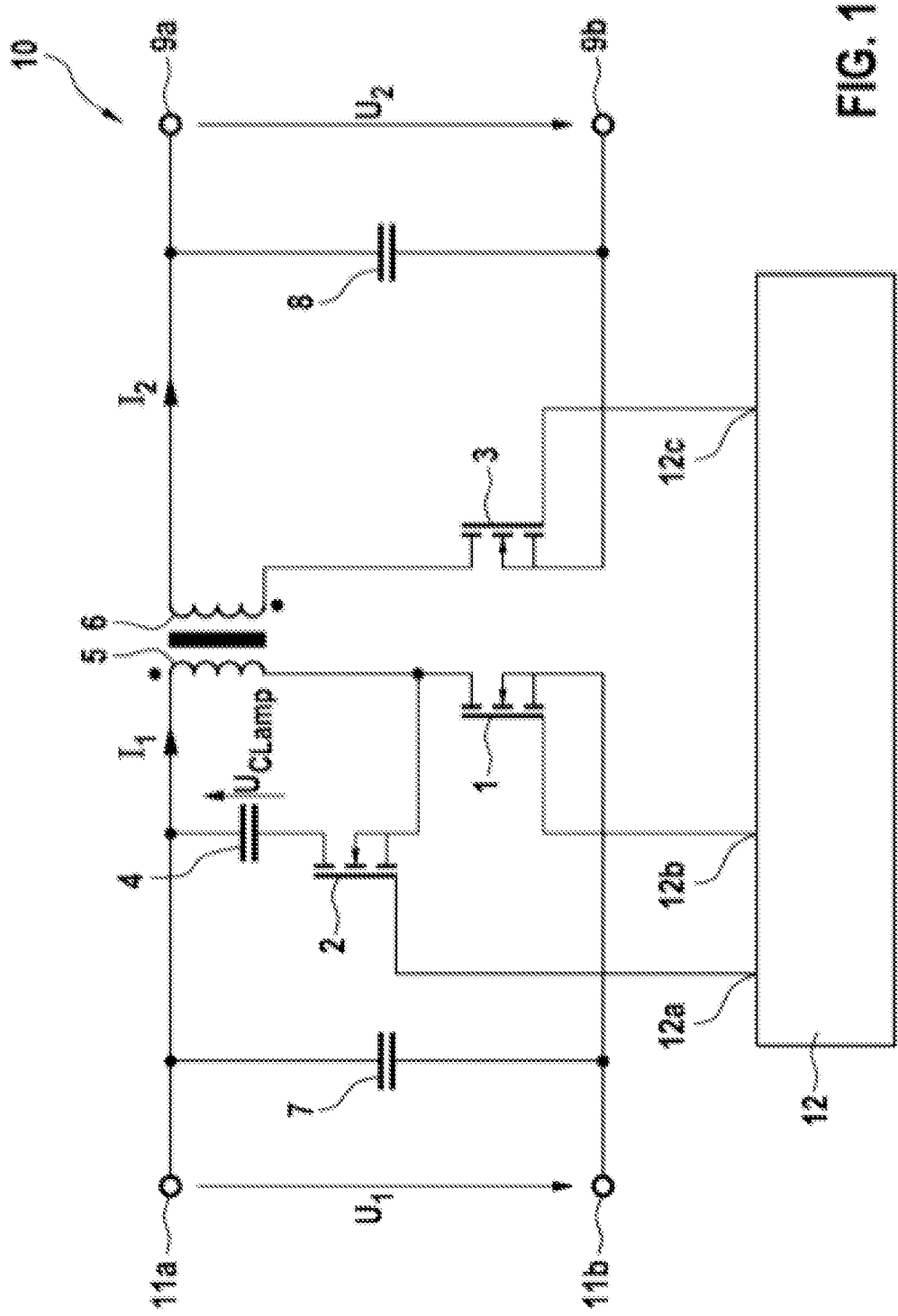
FIG. 1 shows the topology of the DC-DC converter.

FIG. 1 shows a topology of a DC-DC converter 10, in which a first switch 1 is electrically connected to a primary coil 5 of a primary side of the DC-DC converter 10, in a first series circuit. A second switch 2 is arranged on the primary side and is electrically connected to a capacitor 4 in a second series circuit, wherein the second series circuit is connected in parallel with the primary-side primary coil 5. A first contact of the first series circuit on the side of the primary coil 5 is connected to a first primary voltage terminal 11a of the primary side of the DC-DC converter 10, and a second contact of the first series circuit on the side of the first switch 1 is connected to a second primary voltage terminal 11b of the primary side of the DC-DC converter 10. A voltage U1 is present between these terminals 11a and 11b of the primary side. This topology of the primary side of the DC-DC converter represents an example of an actively clamped flyback converter circuit.

A first DC-link capacitor 7 can be electrically connected, as illustrated above, to the first and second primary voltage terminals 11a, 11b of the primary side.

The secondary side of the DC-DC converter 10 has a controlled third switch 3, which, with the secondary coil 6 of the secondary side, forms a third electrical series circuit. A first contact of the third series circuit on the side of the secondary coil 6 forms the first secondary voltage terminal 9a of the secondary side of the DC-DC converter 10, and a second contact of the third series circuit on the side of the third switch 3 forms the second secondary voltage terminal 9b of the secondary side of the DC-DC converter 10. The voltage U2 is present between these terminals 9a and 9b of the secondary side.

A second DC-link capacitor 8 can be electrically connected, as illustrated above, to the first and second secondary voltage terminals 9a, 9b of the secondary side.

The primary coil 5 of the primary side and the secondary coil 6 of the secondary side are inductively coupled to one another. In particular, the inductances are in the form of windings of a transformer which are DC-isolated from one another.

In FIG. 1, the controlled switches 1, 2, 3 are in the form of n-channel MOSFET transistors, but it is also possible for other unipolar components to be used for controlling the current flow. Using a unipolar component gives the advantage of the lower on-state voltage, such as in the case of the MOSFET transistor. Examples of this have already been mentioned further above in the description.

A regulating device 12 is connected with its outputs 12a, 12b and 12c to the control contacts of the second switch 2, the first switch 1 and the third switch 3, respectively. The regulating device 12 is designed to drive the individual switches 1, 2 and 3, for example, corresponding to the drive pattern shown in FIG. 2a. The regulating device 12 controls the control contacts of the three switches 1, 2 and 3 to High or Low, corresponding to the characteristic in FIG. 2a. When the control signal is High, the respective switch is switched so as to be conducting, correspondingly switched on; when the control signal is Low, the respective switch is switched so as to be nonconducting, correspondingly switched off.

In the case of such a time sequence for the driving of the switches, electrical power is transmitted inductively via the transformer comprising the secondary coil 6 and the primary coil 5 from the secondary side of the DC-DC converter to the primary side. This energy is initially stored in the capacitor 4 and then in the primary coil 5 before this energy is output to a load connected to the primary voltage terminals 11a, 11b.

Figure 2:
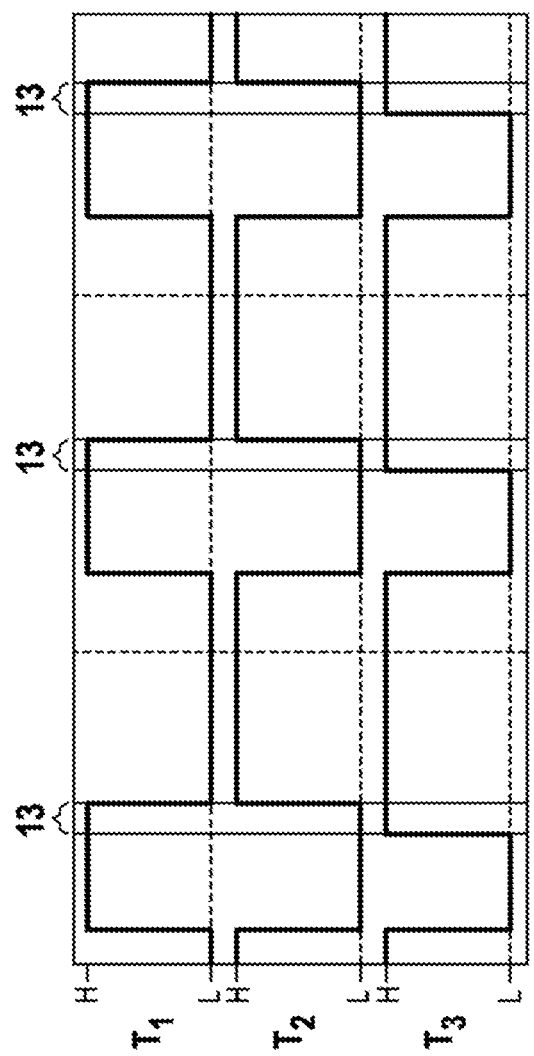
FIG. 2a shows the drive signals of the three switches.
FIG. 2b shows the current characteristics of the primary and secondary sides.
Figure 2:
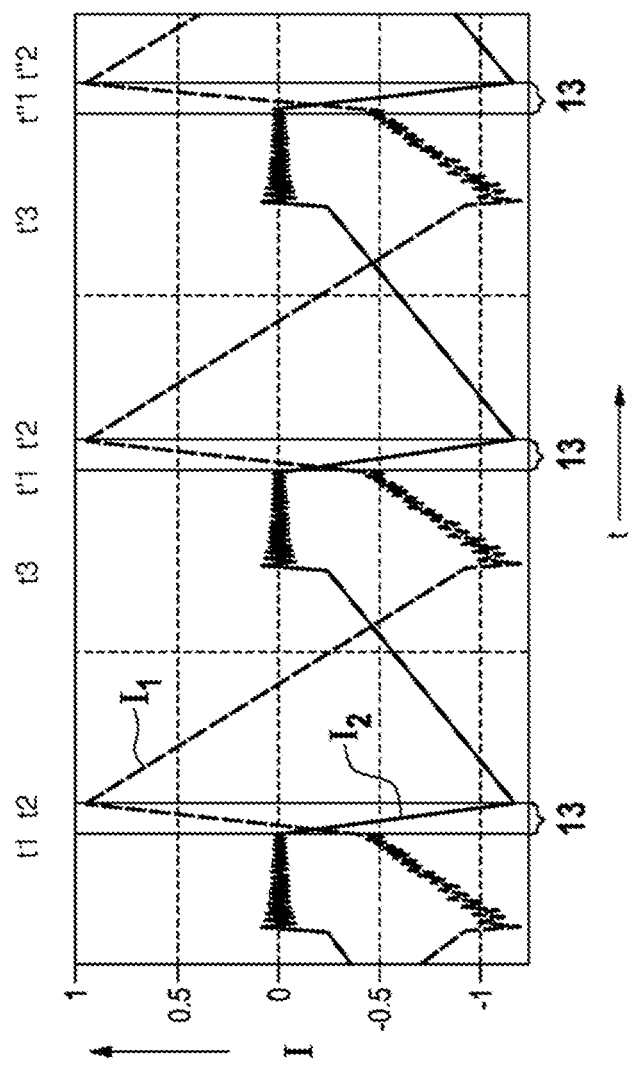

FIG. 2b represents the current characteristics I1 in the primary coil 5 and I2 in the secondary coil 6 of the DC-DC converter which result from the described drive pattern, wherein the arrows denoted by I1 and I2 in FIG. 2a in the primary circuit and in the secondary circuit, respectively, of the DC-DC converter 10 specify the current directions at these points in the topology.

The text which follows describes the current characteristics in FIG. 2b which result from the drive pattern from FIG. 2a, beginning shortly before the third switch 3 of the secondary side is switched so as to be conducting at time t1.

The primary-side primary coil 5 and the secondary-side secondary coil 6, which are inductively coupled, can be considered to be equivalent in an electrical equivalent circuit diagram used for the following description. An equivalent circuit diagram comprises an ideal transformer between the secondary side and the primary side of the DC-DC converter and a leakage inductance in series with a magnetizing inductance on the primary side, wherein the magnetizing inductance is connected in parallel with the ideal transformer.

At the beginning of the consideration, prior to time t1, the first switch 1 is conducting. Both the second switch 2 and the third switch 3 are nonconducting.

Initially, a decaying negative current I1, driven by the magnetizing inductance of the transformer, flows, as a result of which electrical power is transmitted to the primary side.

If now, at time t1, the third switch 3 is switched so as to be conducting, the ZCS mode takes place since the current I2 is very low. With the third switch 3 conducting, the sum of the two voltages U1 and (transformed by means of the transformer) U2 is present at the leakage inductance. Since the leakage inductance is low in comparison with the magnetizing inductance, the current I2 rises steeply in the negative direction, and power is taken from a second DC voltage source connected to the secondary voltage terminals.

The voltage U2 transformed by means of the transformer causes a rise in a current through the magnetizing inductance, resulting from a different winding sense of the windings of the transformer, and this rise also results in a change to the mathematical sign of I1. The duration of the overlapping time period 13, i.e. between times t1 and t2, in which the first switch 1 and the third switch 3 are together switched so as to be conducting, can be used for regulating the power transmission.

At the end of this time period, in which the first switch 1 and the third switch 3 are together switched so as to be conducting, the first switch 1, at time t2, is switched off with low losses. By virtue of the first switch 1 being switched off, the primary-side current I1, commutates, owing to the intrinsic diode, to the reverse-conducting second switch 2, with the result that the second switch S is switched on virtually without any losses, in the ZVS mode.

In this phase, a low negative voltage is present across the leakage inductance, with this voltage being formed from the difference between a voltage $U_{Clamp}$ at the capacitor 4 and the voltage U2 transformed by means of the transformer. Therefore, the negative current I2 decreases.

Virtually the total voltage U2 transformed by means of the transformer is present across the magnetizing inductance, and the current I1 falls correspondingly. Therefore, the energy is stored in the capacitor 4 and in the magnetizing inductance.

The current I1 through the second switch 2 has changed its direction when this phase ends. The switching-off of the second switch 2 therefore takes place at time t3 with low losses. Thereupon, the current commutates through the magnetizing inductance onto the reverse diode of the first switch 1, with the result that the first switch 1 is switched on, virtually without losses in the ZVS mode at time t3.

The current I2 through the third switch 3 has decreased to low values and can therefore be switched off with low losses, virtually in the ZCS mode, in particular offset by a time interval with respect to the switch-off signal of switch 2, in synchronism with the second switch 2 at time t3. Alternatively, the third switch 3 is also switched off passively by reverse recovery of the reverse-conducting diode.

The negative current I1 in the magnetizing inductance now flows to the load which is connected on the primary side to the primary voltage terminals 11a and 11b. In this phase, therefore, the output of the power taken up in the previous phase from the second DC voltage source connected on the secondary side to a first DC voltage source or load connected on the primary side takes place. When the third switch 3 is switched on at t'1, in the ZCS mode, with a low current, the described cycle begins from the beginning.

By way of summary, electrical power is taken up from the secondary side of the circuit and output to the primary side of the circuit. Advantageously, all of the switches are operated, either as the first switch 1 and the second switch 2 in the ZVS mode, or as the third switch 3 in the ZCS mode. The low switching losses at these working points also enable a high switching frequency in the drive pattern or modulation method described here or in this control cycle. Therefore, there is no additional hardware complexity in the circuit in comparison with the operation of the DC-DC converter from the primary side to the secondary side.

The invention claimed is:

1. A DC-DC converter (10) for electrical power transmission from a secondary side to a primary side of the DC-DC converter (10), the DC-DC converter 10 comprising:
   a transformer having a primary-side primary coil (5) and a secondary-side secondary coil (6),
   wherein the primary coil (5) includes a first side and a second side, wherein the first side of the primary coil (5) is connected to a first primary voltage terminal (11a), wherein the second side of the primary coil (5) is connected in series with a first switch (1) and a second primary voltage terminal (11b),
   wherein a capacitor (4) is connected in series with a second switch (2) and in parallel with the primary coil (5), and
   wherein the secondary coil (6) includes a first side and a second side, wherein the first side of the primary coil (6) is connected to a first secondary voltage terminal (9a), wherein the second side of the secondary coil (6) is connected in series with a third switch (3) and a second secondary voltage terminal (9b), and
   a regulating device (12) configured
   to switch the first (1), second (2) and third switches (3) off and on repeatedly for generating an alternating current in the primary coil (5), wherein the first switch (1) is always switched off when the second switch (2) is switched on, and wherein the first switch (1) is always switched on when the second switch (2) is switched off, and
   to switch the third switch (3) off and on depending on a switch position of the first switch (1),
   wherein
   the regulating device (12) is configured
   to set a time at which the third switch (3) is switched on to a time before the first switch (1) is switched off and the second switch (2) is switched on in order to enable a power flow from the secondary side to the primary side.

2. The DC-DC converter (10) as claimed in claim 1, wherein the regulating device (12) is configured to set the time at which the third switch (3) is switched on to a time after the first switch (1) is switched off and the second switch (2) is switched on in order to enable a power flow from the primary side to the secondary side.

3. The DC-DC converter (10) as claimed in claim 2, wherein the regulating device (12) is configured to set, depending on a presettable power transmission direction, the time at which the third switch (3) is switched on to a time before or after the first switch (1) is switched off and the second switch (2) is switched on in order to set a power flow corresponding to the preset power transmission direction.

4. The DC-DC converter (10) as claimed in claim 1, wherein at least one of the first (1), the second (2) or the third (3) switch is manufactured on a basis of silicon technology, silicon carbide technology or gallium nitride technology.

5. A system having:
   a first DC source having a first voltage;
   a second DC source having a second voltage, wherein the first voltage is higher than the second voltage;
   a DC-DC converter as claimed in claim 1, wherein the DC-DC converter (10) is electrically connected on the primary side to the first DC source and is connected on the secondary side to the second DC source having the second voltage.

6. A method for controlling a DC-DC converter (10) in order to transmit electrical power from a secondary side to a primary side of the DC-DC converter (10),
   wherein the DC-DC converter (10)
   has a transformer having a primary-side primary coil (5) and a secondary-side secondary coil (6),
   wherein the primary coil (5) includes a first side and a second side, wherein the first side of the primary coil (5) is connected to a first primary voltage terminal (11a), wherein the second side of the primary coil (5) is connected in series with a first switch (1) and a second primary voltage terminal (11b), wherein a capacitor (4) is connected in series with a second switch (2) and in parallel with the primary coil (5), wherein the secondary coil (6) includes a first side and a second side, wherein the first side of the secondary coil (6) is connected to a first secondary voltage terminal (9a) wherein the second side of the secondary coil (6) is connected in series with a third switch (3) and a second secondary voltage terminal (9b), and has a regulating device (12), the method comprising the following steps:

repeated, via the regulating device (12), switching-off and switching-on of the first (1), second (2) and third switches (3), wherein the first switch (1) is always switched off when the second switch (2) is switched on, and the first switch (1) is always switched on when the second switch (2) is switched off, for generating an alternating current in the primary coil (5), switching-off and switching-on of the third switch (3) depending on a switch position of the first switch (1), and presetting of a time at which the third switch (3) is switched on as a time before the first switch (1) is switched off and the second switch (2) is switched on in order to enable a power flow from the secondary side to the primary side.

7. The method as claimed in claim 6, wherein the regulating device implements further steps:

presetting of a time at which the third switch (3) is switched on as a time after the first switch (1) is switched off and the second switch (2) is switched on in order to enable a power flow from the primary side to the secondary side.

8. The method as claimed in claim 7, wherein the regulating device implements the following further steps:

determination of a presettable power transmission direction, and presetting of a time at which the third switch (3) is switched on as a time before or after the first switch (1) is switched off and the second switch (2) is switched on depending on the determined power transmission direction.

9. A non-transitory computer-readable storage medium, comprising commands which, when run on a computer, cause said computer to control a DC-DC converter (10) in order to transmit electrical power from a secondary side to a primary side of the DC-DC converter (10), wherein the DC-DC converter (10)

has a transformer having a primary-side primary coil (5) and a secondary-side secondary coil (6), wherein the primary coil (5) includes a first side and a second side, wherein the first side of the primary coil (5) is connected to a first primary voltage terminal (11a), wherein the second side of the primary coil (5) is connected in series with a first switch (1) and a second primary voltage terminal (11b), wherein a capacitor (4) is connected in series with a second switch (2) and in parallel with the primary coil (5), wherein the secondary coil (6) includes a first side and a second side, wherein the first side of the secondary coil (6) is connected to a first secondary voltage terminal (9a) wherein the second side of the secondary coil (6) is connected in series with a third switch (3) and a second secondary voltage terminal (9b), and has a regulating device (12), and wherein the regulating device repeatedly switches-off and switches-on of the first (1), second (2) and third switches (3), wherein the first switch (1) is always switched off when the second switch (2) is switched on, and the first switch (1) is always switched on when the second switch (2) is switched off, for generating an alternating current in the primary coil (5), switches-off and switches-on of the third switch (3) depending on a switch position of the first switch (1), and presets a time at which the third switch (3) is switched on as a time before the first switch (1) is switched off and the second switch (2) is switched on in order to enable a power flow from of the secondary side to the primary side.

* * * * *